US008914324B1

(12) United States Patent
Guo et al.

(10) Patent No.: US 8,914,324 B1
(45) Date of Patent: Dec. 16, 2014

(54) DE-DUPLICATION STORAGE SYSTEM WITH IMPROVED REFERENCE UPDATE EFFICIENCY

(75) Inventors: Fanglu Guo, Los Angeles, CA (US); Weibao Wu, Vadnais Heights, MN (US); Tzi-cker Chiueh, Setanket, NY (US); Petros Efstathopoulos, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 958 days.

(21) Appl. No.: 12/580,785

(22) Filed: Oct. 16, 2009

(51) Int. Cl.
  *G06F 17/30* (2006.01)

(52) U.S. Cl.
  USPC .......................................................... 707/640

(58) Field of Classification Search
  USPC .......................................................... 707/640
  See application file for complete search history.

(56) References Cited

U.S. PATENT DOCUMENTS

| 5,274,804 | A | 12/1993 | Jackson |
| 7,373,520 | B1 | 5/2008 | Borthakur |
| 7,376,683 | B1 | 5/2008 | Wolczko |
| 7,454,592 | B1 | 11/2008 | Shah |
| 7,478,113 | B1 | 1/2009 | De Spiegeleer |
| 7,509,360 | B2 | 3/2009 | Wollrath |
| 7,567,188 | B1 | 7/2009 | Anglin |
| 7,672,981 | B1 | 3/2010 | Faibish |
| 7,693,919 | B2 | 4/2010 | Joisha |
| 8,201,021 | B1 * | 6/2012 | Shah et al. ...................... 714/15 |
| 8,204,862 | B1 * | 6/2012 | Paulzagade et al. .......... 707/679 |
| 8,255,366 | B1 * | 8/2012 | Bagley et al. ................. 707/646 |
| 8,315,985 | B1 * | 11/2012 | Ohr et al. ...................... 707/664 |
| 2008/0243769 | A1 | 10/2008 | Arbour |
| 2008/0243878 | A1 | 10/2008 | de Spiegeleer |
| 2008/0243953 | A1 * | 10/2008 | Wu et al. ...................... 707/204 |

OTHER PUBLICATIONS

"Uniprocessor Garbage Collection Techniques", Paul R. Wilson, Lecture Notes in Computer Science; vol. 637, Proceedings of the International Workshop on Memory Management, 1992, pp. 1-42.

* cited by examiner

*Primary Examiner* — Ajay Bhatia
*Assistant Examiner* — Kurt Mueller
(74) *Attorney, Agent, or Firm* — Meyertons, Hood, Kivlin, Kowert & Goetzel, P.C.

(57) ABSTRACT

A system and method for backing up files to a single-instance storage system are disclosed. The files may be split into segments, and the file data may be stored in the single-instance storage system as individual segments. The single-instance storage system uses the concept of a file region which covers multiple segments of the file. If a region of a file is unchanged from one backup to the next, the system may use a region object to refer to the unchanged region. This avoids the need to update the reference information for each of the segments within the region, thus increasing the efficiency of backing up the new version of the file.

20 Claims, 8 Drawing Sheets

Previous version of file: | 50A | 50B | 50C | 50D | 50E | 50F | 50G | 50H | 50J |

New version of file: | 50A | 50B | 50C | 50K | 50E | 50F | 50G | 50H | 50J |

FIG. 5

DE-DUPLICATION STORAGE SYSTEM WITH IMPROVED REFERENCE UPDATE EFFICIENCY

BACKGROUND OF THE INVENTION

1. Field of the Invention

This invention relates generally to data backup software for computer systems. More particularly, the invention relates to backup software which operates to efficiently backup files in a de-duplication storage system.

2. Description of the Related Art

Large organizations often use backup storage systems which backup files used by a plurality of client computer systems. The backup storage system may utilize data de-duplication techniques to avoid the amount of data that has to be stored. For example, it is possible that a file changes little or not at all from one backup to the next. De-duplication techniques can be utilized so that portions of the file data which have already been backed up do not need to be backed up again. The file may be split into multiple segments, and the file segments may be individually stored in the backup storage system as segment objects. When a new version of the file is backed up, the backup software may check whether or not segment objects representing the current file segments are already stored in the backup storage system. Each segment object which is already stored may be referenced again without storing a new duplicate of the segment object.

If a particular version of a file is deleted from the backup storage system, the underlying segment objects referenced by the version also need to be deleted, but only if they are not referenced by other versions of the file (or referenced by other files). The backup software may store reference information for each segment object to decide when the segment object can be deleted. When each respective version of the file is added to the system, the reference information for each segment object used by the respective version may be updated to indicate that it is used by the respective version. Similarly, when each respective version of the file is deleted from the system, the reference information for each segment object used by the respective version may be updated to indicate that it is no longer used by the respective version. When the reference information for a given segment object indicates that it is no longer used by any versions of any files then the given segment object can be deleted.

Unfortunately, updating the reference information for each segment object can be inefficient. For example, consider a large database file several hundred gigabytes in size. It is likely that only a small percentage, e.g., 10%, of the segments of the file change from one backup to the next. Although the 90% of the segments which are unchanged can be re-used, the reference information for each one still needs to be updated, which adds significant performance overhead to the backup operation.

Some backup storage systems need to update the reference information for existing segment objects tens or hundreds of millions of times each day. In some systems, the time needed to update the reference information is a majority of the overall time needed to perform the backup operations. Thus, updating the reference information is a limiting factor in the scalability of some de-duplication storage systems.

SUMMARY

Various embodiments of a system and method for backing up a particular version of a file are disclosed. The file includes a plurality of data segments. Backing up the particular version of the file may include determining that one or more of the data segments have changed since a previous version of the file was backed up. Backing up the particular version of the file may also include determining that one or more regions of the file have not changed since the previous version of the file was backed up, where each of the one or more regions includes two or more of the data segments. Backing up the file may also include storing file information representing the particular version of the file, where the file information specifies each of the one or more regions that have not changed, and also specifies each of the one or more data segments that have changed.

Backing up the file may also include updating respective reference information for each of the one or more data segments that have changed to indicate that the one or more data segments are referenced by the file information. In some embodiments respective reference information for each of the one or more regions that have not changed may also be updated to indicate that the one or more regions are referenced by the file information. The respective reference information for each of the one or more regions may be updated without updating reference information for the data segments included in each of the one or more regions.

According to a further embodiment, backing up the particular version of the file may include storing a respective segment object corresponding to each data segment of the file. The file information may specify each of the data segments that have changed by specifying the corresponding segment objects. In some embodiments the file information may specify the segment objects may specifying a fingerprint of each segment object. Additionally, a respective region object corresponding to each of the one or more regions that have not changed may be stored. The file information may specify each of the one or more regions that have not changed by specifying the corresponding region objects. Each respective region object may specify the segment objects corresponding to the data segments included in the region corresponding to the respective region object.

BRIEF DESCRIPTION OF THE DRAWINGS

A better understanding of the invention can be obtained when the following detailed description is considered in conjunction with the following drawings, in which:

FIG. 5 illustrates an example of a previous version of a file and a new version of a file;

Figure 1:
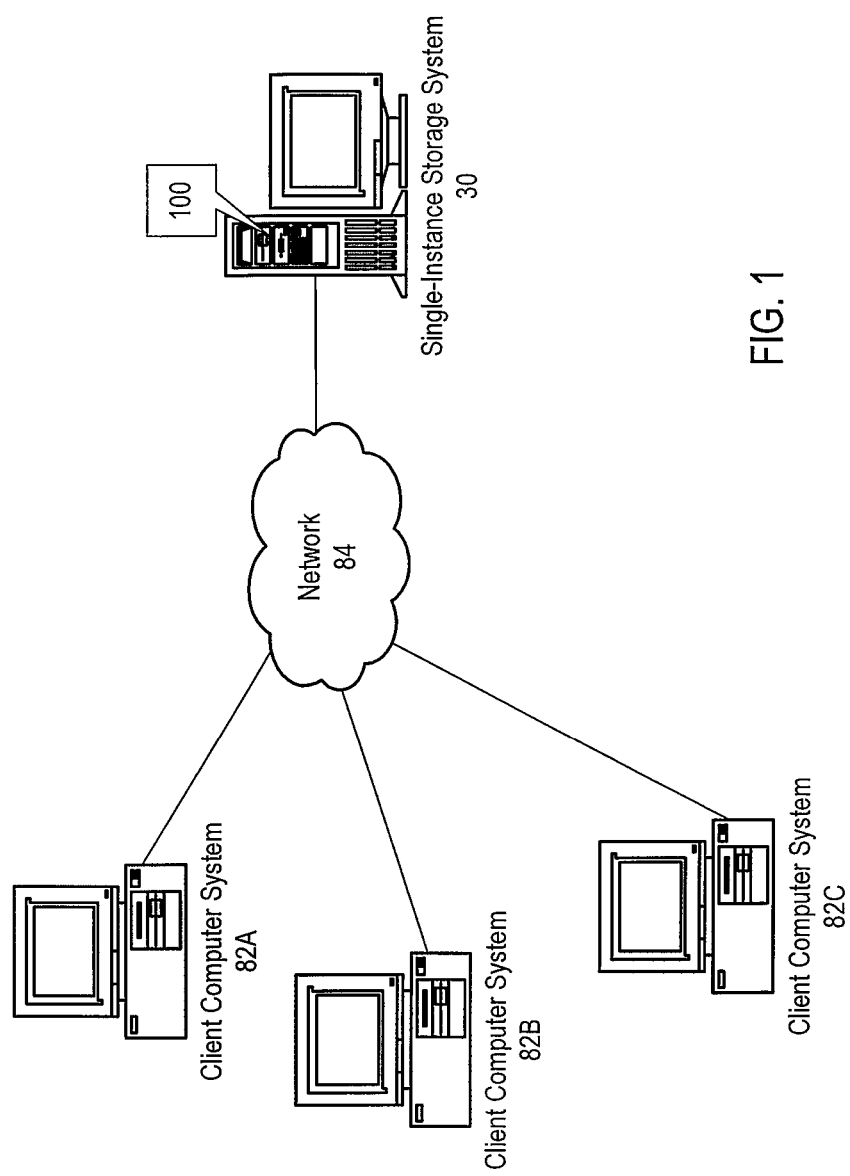
FIG. 1 illustrates a plurality of client computer systems coupled to a single-instance storage system.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for backing up files are disclosed. The method may operate to backup the files to a storage system in which de-duplication techniques are utilized in order to avoid storing duplicate copies of the file data. A storage system which uses de-duplication to store and reference a single instance of a data object in order to avoid storing multiple copies of the data object is referred to herein as a single-instance storage system. The files may be split into segments, and the file data may be stored in the single-instance storage system as individual segments. In order to increase the efficiency of backing up new versions of the files, the single-instance storage system may use the concept of a file region which covers multiple segments of the file. As described in detail below, if a region of a file is unchanged from one backup to the next, the system may use a region object to refer to the unchanged region. This may avoid the need to update the reference information for each of the segments within the region, thus increasing the efficiency of backing up the new version of the file.

FIG. 1 illustrates a plurality of client computer systems 82 coupled to a single-instance storage system 30 by a network 84. In various embodiments, the client computer systems 82 may be coupled to the single-instance storage system 30 by any type of network or combination of networks. For example, the network 84 may include any type or combination of local area network (LAN), a wide area network (WAN), an Intranet, the Internet, etc. Examples of local area networks include Ethernet networks, Fiber Distributed Data Interface (FDDI) networks, and token ring networks. Also, each computer or device may be coupled to the network using any type of wired or wireless connection medium. For example, wired mediums may include Ethernet, fiber channel, a modem connected to plain old telephone service (POTS), etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

The single-instance storage system 30 may execute backup software 100 which receives files from the client computer systems 82 via the network 84 and stores the files, e.g., for backup storage. For example, the backup software 100 may periodically communicate with the client computer systems 82 in order to backup files located on the client computer systems 82. Thus, the backup software 100 may backup a given file from a particular client computer system 82 multiple times, e.g., may backup multiple versions of the file as it exists at different points in time. In some embodiments the client computer system 82 may execute client-side backup software which communicates with the backup software 100 in the single-instance storage system 30 to determine which portions of the file have already been stored in the single-instance storage system 30. Portions which have already been stored may not be transferred to the single-instance storage system 30 when a new version of the file is backed up, but instead the existing stored portions may be referenced again.

Figure 2:
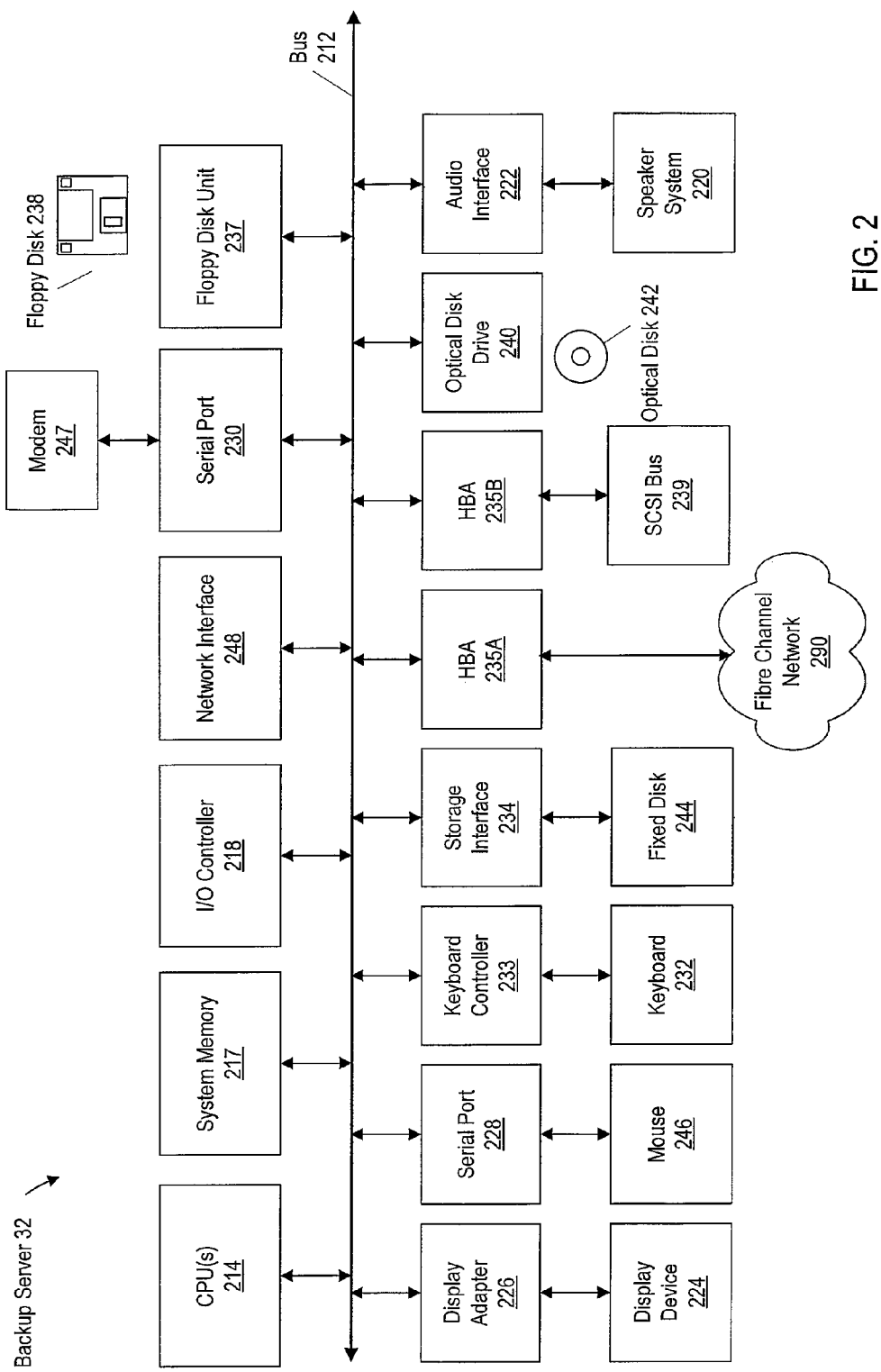
FIG. 2 is a diagram illustrating an example of a backup server computer in the single-instance storage system.

The single-instance storage system 30 may include one or more backup server computers 32 which execute the backup software 100 and communicate with the client computer systems 82. FIG. 2 is a diagram illustrating an example of a backup server computer 32 in detail according to one embodiment. In general, the backup server computer 32 may be any type of physical computer or computing device, and FIG. 2 is given as an example only. In the illustrated embodiment, the backup server 32 includes a bus 212 which interconnects major subsystems or components of the backup server 32, such as one or more central processor units 214, system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

The bus 212 allows data communication between central processor(s) 214 and system memory 217, which may include read-only memory (ROM) or flash memory (neither shown), and random access memory (RAM) (not shown), as previously noted. The RAM is generally the main memory into which software programs are loaded, including the backup software 100. The ROM or flash memory can contain, among other code, the Basic Input-Output system (BIOS) which controls basic hardware operation such as the interaction with peripheral components. Software resident with the backup server 32 is generally stored on and accessed via a computer-readable medium, such as a hard disk drive (e.g., fixed disk 244), an optical drive (e.g., optical drive 240), a floppy disk unit 237, or other storage medium. Additionally, software can be received through the network modem 247 or network interface 248.

The storage interface 234, as with the other storage interfaces of the node 10, can connect to a standard computer-readable medium for storage and/or retrieval of information, such as one or more disk drives 244. The backup software 100 may store the file data received from the client computer systems 82 on the disk drive(s) 244. In some embodiments the backup software 100 may also, or may alternatively, store the file data on a shared storage device 40. In some embodiments the shared storage device 40 may be coupled to the backup server 32 through the fibre channel network 290. In other embodiments the shared storage device 40 may be coupled to the backup server 32 through any of various other types of storage interfaces or networks. Also, in other embodiments the backup software 100 may store the file data on any of various other types of storage devices included in or coupled to the backup server computer 32, such as tape storage devices, for example.

Many other devices or subsystems (not shown) may be connected to the backup server 32 in a similar manner. Conversely, all of the devices shown in FIG. 2 need not be present to practice the present disclosure. The devices and subsystems can be interconnected in different ways from that shown in FIG. 2. Code to implement the backup software 100 described herein may be stored in computer-readable storage media such as one or more of system memory 217, fixed disk 244, optical disk 242, or floppy disk 238. The operating system provided on the backup server 32 may be a Microsoft Windows® operating system, UNIX® operating system, Linux® operating system, or another operating system.

Figure 3:
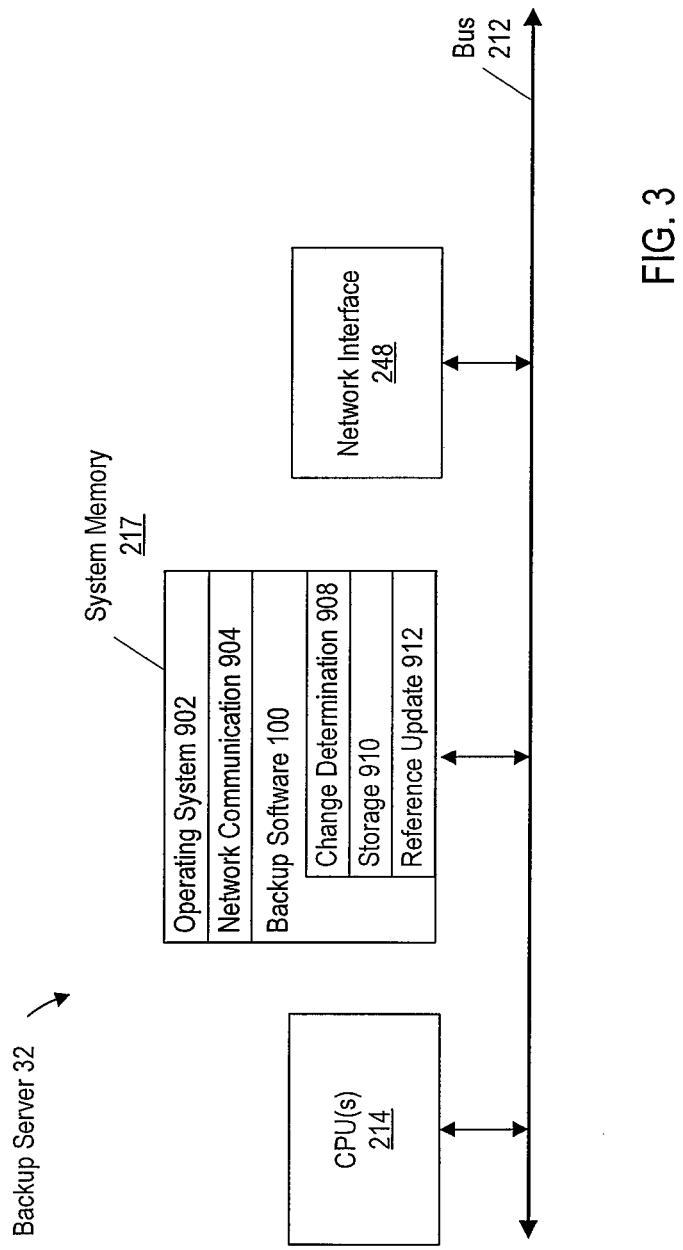
FIG. 3 illustrates various software modules stored in the system memory of the backup server computer.

FIG. 3 illustrates various software modules stored in the system memory 217 of the backup server 32. The program instructions of the software modules are executable by the one or more processors of the backup server 32. The software modules illustrated in FIG. 3 are given as one example of a software architecture which implements various features described herein. In other embodiments, other software architectures may be used.

In the illustrated embodiment the software of the backup server 32 includes operating system software 902 which manages the basic operation of the backup server 32. The software of the backup server 32 also includes a network communication module 904. The network communication module 904 may be used by the operating system software 902, backup software 100, or other software modules in order to communicate with other computer systems, such as the client computer systems 82. The software of the backup server 32 also includes the backup software 100. The backup software 100 includes various modules such as a change determination module 908, a storage module 910, and a reference update module 912. The functions performed by the various modules of the backup software 100 are described below.

Suppose that the backup software 100 backs up a particular version of a file at a particular time, and then needs to backup a new version of the file at a subsequent time.

Figure 4:
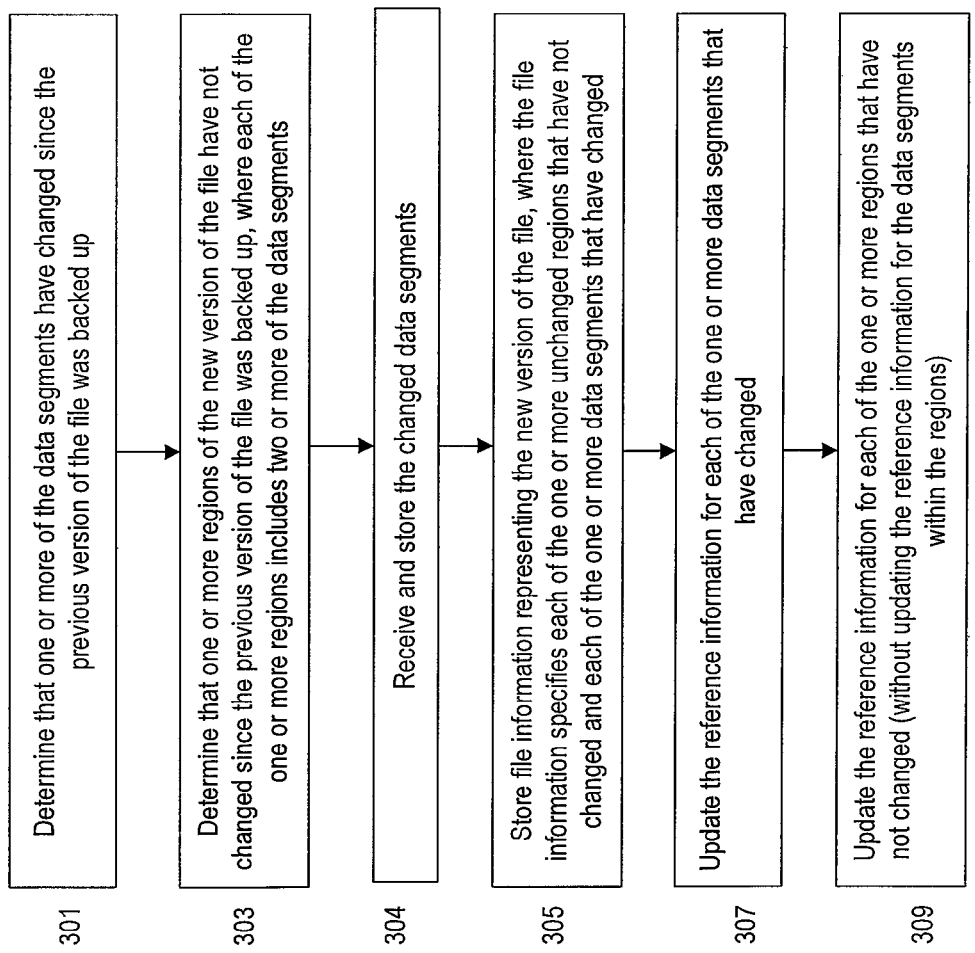
FIG. 4 is a flowchart diagram illustrating one embodiment of a method for backing up a new version of a file to the single-instance storage system.

The version of the file that was backed up in the previous backup operation is referred to as the previous version of the file. FIG. 4 is a flowchart diagram illustrating one embodiment of a method for backing up the new version of the file. The method may be implemented by the backup software 100 executing on one or more backup servers 32 of the single-instance storage system 30.

The new version of the file may be treated as a plurality of data segments. For example, if the file is 10000 bytes long and each data segment is 1000 bytes then the file may be treated as 10 data segments of 1000 bytes each. In other embodiments the data segments may vary in length from each other.

As indicated in block 301, the change determination module 908 of the backup software 100 may determine that one or more of the data segments have changed since the previous version of the file was backed up, e.g., may determine that the data contained in one or more of the data segments is different than the data contained in the corresponding segments of the previous version of the file.

Although one or more of the data segments of the file have changed since the previous version of the file was backed up, most of the file may be unchanged in a typical backup scenario. The backup software 100 may use the concept of a file "region" to represent the portions of the file that have not changed. A region includes two or more contiguous data segments of the file, and thus a region represents a larger portion of the file than a data segment.

As indicated in block 303, the change determination module 908 of the backup software 100 may determine that one or more regions of the new version of the file have not changed since the previous version of the file was backed up. For each data segment within an unchanged region, the data contained in the data segment is the same as the data contained in the corresponding segment of the previous version of the file.

In various embodiments the change determination module 908 may use any technique to determine which portions of the file have changed from the previous version to the new version. In some embodiments the client computer system 82 from which the file originates may maintain change information which can be used by the backup software 100 to determine the changed portions of the file. For example, the client computer system 82 may execute file system software or volume manager software which stores change information in response to write operations in order to indicate which portions of the file are affected by the write operations. Thus, the backup software 100 may receive and analyze the change information in order to identify the one or more data segments that have changed and the one or more regions that have not changed.

As indicated in block 304, the storage module 910 of the backup software 100 may receive and store each of the one or more data segments that has changed since the previous version of the file. For example, the storage module 910 may communicate with the client computer system 82 from which the file originates to receive the changed data segments. The regions of the file that have not changed do not need to be transmitted from the client computer system 82 to the backup server 32 since the data of these regions was already stored when in the single-instance storage system 30 when the file was previously backed up. It is also possible that even if a particular data segment has changed, a copy of the changed data segment may already be stored in the single-instance storage system 30. In some embodiments the client computer system 82 from which the file originates may compute a fingerprint or signature of each changed data segments and transmit the fingerprints to the backup software 100. The backup software 100 may use the fingerprints to lookup whether the changed data segments are already stored. Segments which are already stored do not need to be transmitted to the backup server 32, but instead can be referenced again.

As indicated in block 305, the storage module 910 of the backup software 100 may store file information, e.g., a file object, representing the new version of the file. The file information specifies each of the one or more regions that have not changed, as well as each of the one or more data segments that have changed. Thus, the file information specifies individual pieces (data segments or regions) which together compose the file so that the file can be re-composed using the file information, e.g., in the event that it subsequently becomes necessary to restore the file.

In various embodiments the file information may specify the data segments and regions in various ways. In some embodiments, each data segment may have a fingerprint or signature that is computed by applying a hash function or other function to the data of the data segment. The fingerprints of the changed data segments may be listed in the file information. Similarly, each region may have a fingerprint or signature that is computed by applying a hash function or other function to the data of the data segments within the region. The fingerprints of the unchanged regions may be listed in the file information.

As indicated in block 307, the reference update module 912 of the backup software 100 may update the reference information for each of the one or more data segments that have changed. In various embodiments the reference information for each data segment may be represented in various ways. In some embodiments the reference information may simply be a reference count which specifies how many files (or regions) reference the data segment. Thus, in some embodiments the reference information for each of the changed data segments may be updated by simply incrementing the reference count. If the changed data segment is a newly stored data segment then the reference count may be incremented from 0 to 1. If the changed data segment was previously stored in the single-instance storage system and had a reference count of N then the reference count may be incremented to N+1. In other embodiments the reference information for each data segment may be a reference list which specifies the particular files (or regions) which use the data segment. Thus, in some embodiments the reference information for each of the changed data segments may be updated by adding an ID or other information specifying the new version of the file to the reference list.

As indicated in block 309, the reference update module 912 of the backup software 100 may also update the reference information for each of the one or more regions that have not changed, e.g., by incrementing a reference count or adding information to a reference list for each of the unchanged regions. The reference information each unchanged region is updated without updating the reference information for the data segments within the region.

In various embodiments the method of FIG. 4 may substantially decrease the inefficiency associated with updating the reference information for the data segments of a file when backing up a new version of the file. For example, suppose that 90% of the file is unchanged from the previous version to the new version. The unchanged 90% of the file may be represented by one or more regions, where each region includes at least two data segments of the file. Suppose for example that there are 10 unchanged regions, where each region includes 2 unchanged data segments. Thus, the backup software may perform 10 reference information update operations (once for each unchanged region) instead of performing 20 reference information update operations for the underlying data segments, thus increasing the efficiency by a factor of 2. As another example, suppose that there are 2 unchanged regions, where each region includes 10 unchanged data segments. Thus, the backup software may perform 2 reference information update operations (once for each unchanged region) instead of performing 20 reference information update operations for the underlying data segments, thus increasing the efficiency by a factor of 10.

In various embodiments the backup software 100 may use any of various techniques in order to determine which data segments should be grouped into a region. In some embodiments each region may have a fixed size (e.g., a fixed number of data segments). In various embodiments the regions may include any number of data segments. Increasing the region size may increase the backup efficiency by reducing the number of reference information update operations that have to be performed. However, increasing the region size may also make it more likely that at least one of the data segments within a region will change from one backup to the next. Thus, the region size may be set to different sizes in order to achieve an appropriate tradeoff.

In other embodiments the regions may vary in the number of data segments they contain. For example, the backup software 100 may calculate a first unchanged region that contains 10 data segments, a second unchanged region that contains 7 data segments, a third region that contains 20 data segments, etc.

The backup software 100 may create the regions at various times. In some embodiments, regions may be created when the first version of a new file is received for storage in the single-instance storage system. For example, the data segments of the file may be grouped into regions, and the file information for the first version of the new file may specify the regions instead of specifying the underlying data segments of the regions. When subsequent versions of the file are stored in the system, the regions that were previously created may be referenced again if their underlying data segments are unchanged.

In other embodiments the backup software 100 may create the regions only after determining that the underlying data segments have remained unchanged from one version of the file to the next. For example, regions may not be created when the first version of a new file is stored in the system. The file information for the first version of the new file may instead directly specify the data segments of the file. When a request to store the next version of the file is received, the backup software 100 may determine which data segments of the file are unchanged and may create one or more regions covering the unchanged data segments at that time. In other embodiments the backup software 100 may create regions only if the underlying data segments have remained unchanged for three or more versions of the file. For example, the backup software 100 may track changes across several versions of the file in order to determine how best to create the regions so that the regions can be re-used for multiple versions of the file.

When the backup software 100 determines that particular data segments of a file can be grouped into a region, the backup software 100 may first check to determine whether a region object for that region has already been created before creating a new region object. For example, the backup software 100 may create a fingerprint or signature of the region using the data of the particular data segments. The backup software may then attempt to lookup the fingerprint in an index. If the fingerprint is present then the index specifies information to retrieve a previously created region object. This region object can be re-used. Otherwise, if the fingerprint is not present in the index, the backup software 100 may create a new region object and add its fingerprint to the index.

FIG. 5 illustrates an example of a previous version of a file and a new version of a file. The previous version of the file has 9 data segments: 50A, 50B, 50C, 50D, 50E, 50F, 50G, 50H and 50J. The new version of the file is identical to the previous version except that the data of the fourth data segment has changed, as indicated in the drawing by changing this data segment to the data segment 50K.

Figure 6:
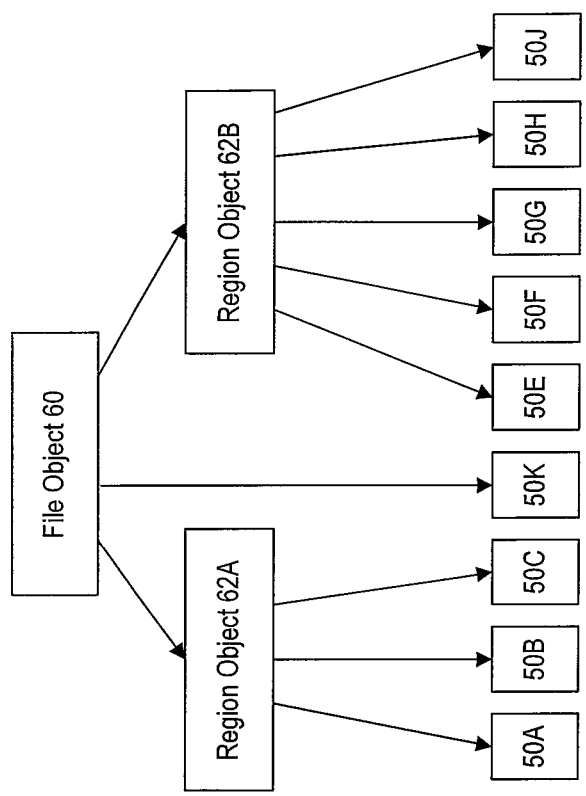
FIGS. 6-8 illustrate examples of information stored when backing up the new version of the file of FIG. 5 to the single-instance storage system.

FIG. 6 illustrates information stored by the backup software 100 when backing up the new version of the file in FIG. 5 according to one embodiment. The file object 60 stores the file information representing the new version of the file. In this example, the backup software has grouped the first three unchanged data segments (50A, 50B, 50C) into one region represented by the region object 62A, and has grouped the last five unchanged data segments (50E, 50F, 50G, 50H, 50J) into another region represented by the region object 62B. The file object 60 specifies the region objects 62A and 62B representing the unchanged regions of the file, and also specifies a segment object representing the changed data segment 50K. The region object 62A specifies segment objects representing the data segments 50A, 50B 50C. The region object 62B specifies segment objects representing the data segments 50E, 50F, 50G, 50H, 50J. Thus, in this example, the unchanged regions of the file vary in size from each other.

Figure 7:
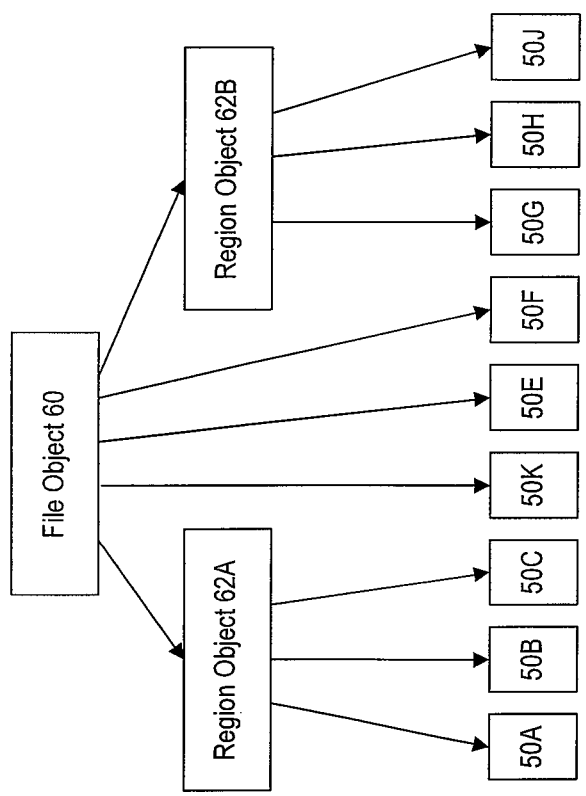

FIG. 7 illustrates information stored by the backup software 100 when backing up the new version of the file in FIG. 5 according to another embodiment. In this example, the backup software has again grouped the first three unchanged data segments (50A, 50B, 50C) into one region represented by the region object 62A. In this example, the unchanged regions have a fixed size of three data segments. The backup software has grouped the last three unchanged data segments (50G, 50H, 50J) into another region represented by the region object 62B. The file object 60 specifies the region objects 62A and 62B representing the unchanged regions of the file, and also specifies the a segment object representing the changed segment 50K. In addition, the file object 60 also directly specifies segment objects representing the unchanged data segments 50E and 50F. Thus, in some embodiments the file information (e.g., file object) for a particular version of a file may specify one or more changed data segments, one or more unchanged data segments, and one or more regions, where each region includes two or more unchanged data segments.

Figure 8:
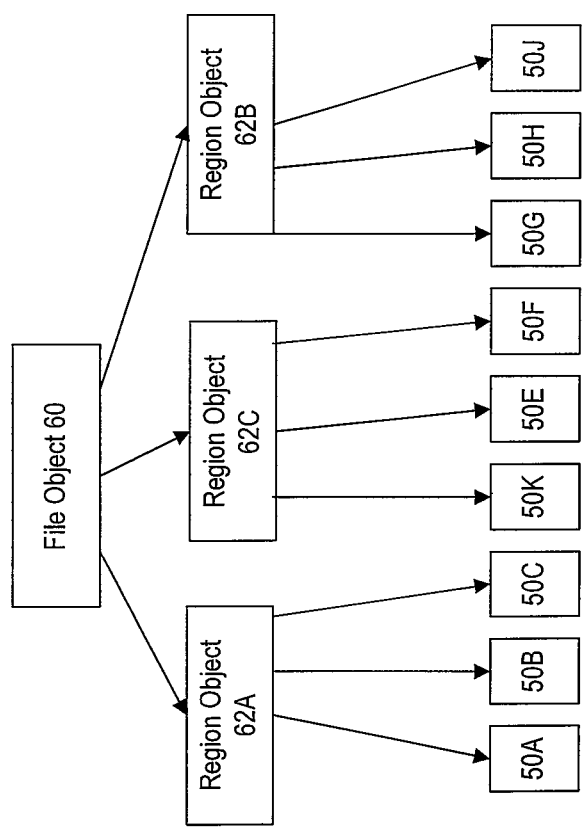

In another embodiment in which fixed-size regions are used, the backup software 100 may create another region to cover the data segments 50K, 50E and 50F, as illustrated in FIG. 8 by the region object 62C. In some embodiments the region object 62C may be created when the new data segment 50K is first encountered, e.g., when the first new version of the file which includes the data segment 50K is stored in the system. In other embodiments the file object 60 may directly reference the data segments 50K, 50E and 50F when the first new version of the file which includes the data segment 50K is stored in the system, as illustrated in FIG. 7. In new versions of the file, the region object 62C which references the data segments 50K, 50E and 50F may be created if these data segments are unchanged, and the file object 60 may specify the region object 62C instead of the data segments 50K, 50E and 50F. The region object 62C may be used for new versions of the file as long as the underlying data segments 50K, 50E and 50F are unchanged, thus avoiding the need to update the reference information for all of these data segments when the new versions of the file are stored in the system.

Various embodiments of a method for backing up files have been described above. The method is implemented by various devices operating in conjunction with each other, and causes a transformation to occur in one or more of the devices. For example, a backup server computer of the single-instance storage system (or a storage device used by the backup server computer) may be transformed by storing file information as discussed above.

It is noted that various functions described herein may be performed in accordance with cloud-based computing techniques or software as a service (Saas) techniques in some embodiments. For example, in some embodiments the functionality of the backup software 100 may be provided as a cloud computing service.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A non-transitory computer-accessible storage medium storing program instructions executable to:
   backup a particular version of a file, wherein the file includes a plurality of data segments, wherein each of the data segments includes a plurality of bytes of data, wherein in backing up the particular version of the file, the program instructions are executable to:
   identify a plurality of regions of the file, wherein each of the regions includes two or more data segments of the plurality of data segments;
   in response to determining that one or more of the data segments have changed since a previous version of the file was backed up, store each of the one or data segments that have changed;
   determine that one or more of the regions of the file have not changed since the previous version of the file was backed up;
   store file information representing the particular version of the file, wherein the file information includes information referencing each of the one or more regions that have not changed and information referencing each of the one or more data segments that have changed; and
   update respective reference information for each of the one or more regions that have not changed to indicate that the one or more regions are referenced by the file information.

2. The computer-accessible storage medium of claim 1, wherein the program instructions are executable to update the respective reference information for each of the one or more regions without updating reference information for the data segments included in each of the one or more regions.

3. The computer-accessible storage medium of claim 1, wherein the program instructions are further executable to update respective reference information for each of the one or more data segments that have changed to indicate that the one or more data segments are referenced by the file information.

4. The computer-accessible storage medium of claim 1, wherein the program instructions are further executable to:
   group the one or more data segments that have changed into a new region, wherein the information referencing each of the one or more data segments that have changed includes information directly specifying the new region and does not include information directly specifying the one or more data segments that have changed.

5. The computer-accessible storage medium of claim 1, wherein the one or more data segments that have changed since the previous version of the file was backed up are a first one or more of the data segments of the file, wherein in backing up the particular version of the file, the program instructions are further executable to:
   determine that a second one or more of the data segments of the file have changed since the previous version of the file was backed up; and
   determine that each respective data segment of the second one or more data segments was previously backed up when backing up another version of the file;
   wherein the file information includes information referencing each data segment of the second one or more data segments.

6. The computer-accessible storage medium of claim 1, wherein the program instructions are further executable to:
   store a respective segment object corresponding to each data segment of the file, wherein the file information specifies each of the data segments that have changed by specifying the corresponding segment objects;

store a respective region object corresponding to each of the one or more regions that have not changed, wherein the file information specifies each of the one or more regions that have not changed by specifying the corresponding region objects, wherein each respective region object specifies the segment objects corresponding to the data segments included in the region corresponding to the respective region object.

7. The computer-accessible storage medium of claim 1, wherein the file information specifies each of the one or more data segments that have changed by specifying a respective fingerprint of each of the one or more data segments.

8. The computer-accessible storage medium of claim 1, wherein the program instructions are further executable to store a respective region object for each of the one or more regions of the file have not changed;

wherein the file information specifies each of the one or more regions that have not changed by specifying the respective region object for each of the one or more regions that have not changed.

9. The computer-accessible storage medium of claim 8, wherein the program instructions are executable to store the one or more respective region objects for the one or more regions of the file that have not changed while backing up the particular version of the file.

10. The computer-accessible storage medium of claim 8, wherein the program instructions are executable to store the one or more respective region objects for the one or more regions of the file that have not changed prior to backing up the particular version of the file.

11. The computer-accessible storage medium of claim 1, wherein the one or more regions of the file that have not changed include a particular region;

wherein the program instructions are further executable to:
 determine that a region object for the particular region was already stored prior to initiating backup of the particular version of the file; and
 store information referencing the region object for the particular region in the file information.

12. The computer-accessible storage medium of claim 1, wherein the one or more regions of the file that have not changed include at least two regions;

wherein each region of the at least two regions includes the same number of data segments.

13. The computer-accessible storage medium of claim 1, wherein the one or more regions of the file that have not changed include at least two regions;

wherein different regions of the at least two regions include different numbers of data segments.

14. A method comprising:
backing up a particular version of a file to a computer system, wherein the file includes a plurality of data segments, wherein each of the data segments includes a plurality of bytes of data, wherein backing up the particular version of the file includes:
 identifying a plurality of regions of the file, wherein each of the regions includes two or more data segments of the plurality of data segments;
 in response to determining that one or more of the data segments have changed since a previous version of the file was backed up, storing each of the one or data segments that have changed;
 determining that one or more of the regions of the file have not changed since the previous version of the file was backed up;
 storing file information representing the particular version of the file in the computer system, wherein the file information includes information referencing each of the one or more regions that have not changed and information referencing each of the one or more data segments that have changed; and
 updating respective reference information for each of the one or more regions that have not changed to indicate that the one or more regions are referenced by the file information.

15. The method of claim 14, wherein the respective reference information for each of the one or more regions is updated without updating reference information for the data segments included in each of the one or more regions.

16. The method of claim 14, wherein the method further comprises updating respective reference information for each of the one or more data segments that have changed to indicate that the one or more data segments are referenced by the file information.

17. The method of claim 14, further comprising:
grouping the one or more data segments that have changed into a new region, wherein the information referencing each of the one or more data segments that have changed includes information directly specifying the new region and does not include information directly specifying the one or more data segments that have changed.

18. A system comprising:
one or more processors; and
memory storing program instructions;
wherein the program instructions are executable by the one or more processors to backup a particular version of a file, wherein the file includes a plurality of data segments, wherein each of the data segments includes a plurality of bytes of data, wherein in backing up the particular version of the file, the program instructions are executable by the one or more processors to:
 identify a plurality of regions of the file, wherein each of the regions includes two or more data segments of the plurality of data segments;
 in response to determining that one or more of the data segments have changed since a previous version of the file was backed up, store each of the one or data segments that have changed;
 determine that one or more of the regions of the file have not changed since the previous version of the file was backed up;
 store file information representing the particular version of the file, wherein the file information includes information referencing each of the one or more regions that have not changed and information referencing each of the one or more data segments that have changed; and
 update respective reference information for each of the one or more regions that have not changed to indicate that the one or more regions are referenced by the file information.

19. The system of claim 18, wherein the program instructions are executable by the one or more processors to update the respective reference information for each of the one or more regions without updating reference information for the data segments included in each of the one or more regions.

20. The system of claim 18,
wherein the program instructions are further executable by the one or more processors to update respective reference information for each of the one or more data segments that have changed to indicate that the one or more data segments are referenced by the file information.

\* \* \* \* \*